US011203168B2

(12) United States Patent
Hixon

(10) Patent No.: US 11,203,168 B2
(45) Date of Patent: Dec. 21, 2021

(54) METHOD OF MANUFACTURING CROSS-CORRUGATED SUPPORT STRUCTURES

(71) Applicant: Applied Structural Materials, LLC, New Orleans, LA (US)

(72) Inventor: Neal Hixon, New Orleans, LA (US)

(73) Assignee: Applied Structural Materials, LLC, New Orleans, LA (US)

( * ) Notice: Subject to any disclaimer, the term of this patent is extended or adjusted under 35 U.S.C. 154(b) by 0 days.

(21) Appl. No.: 16/486,790

(22) PCT Filed: Aug. 29, 2017

(86) PCT No.: PCT/US2017/049172
§ 371 (c)(1),
(2) Date: Aug. 16, 2019

(87) PCT Pub. No.: WO2019/040086
PCT Pub. Date: Feb. 28, 2019

(65) Prior Publication Data
US 2020/0230896 A1    Jul. 23, 2020

Related U.S. Application Data

(63) Continuation-in-part of application No. PCT/US2017/047792, filed on Aug. 21, 2017.

(51) Int. Cl.
*B29C 70/36* (2006.01)
*B29C 53/24* (2006.01)
*E04C 5/07* (2006.01)
*E04C 5/06* (2006.01)
(Continued)

(52) U.S. Cl.
CPC .............. *B29C 70/36* (2013.01); *B29C 53/24* (2013.01); *E04C 5/06* (2013.01); *E04C 5/07* (2013.01);
(Continued)

(58) Field of Classification Search
CPC .............. B29C 53/24; B29C 70/34–36; B29C 70/44–48; B29C 2791/006; B29C 70/443; B29L 2016/00
See application file for complete search history.

(56) References Cited

U.S. PATENT DOCUMENTS 1,886,830 A * 11/1932 Murray, Jr. ............ B21D 53/08
                                                     219/91.23
3,217,845 A    11/1965 Reynolds
3,357,147 A * 12/1967 Lerner ...................... E04B 5/29
                                                        52/326
(Continued)

FOREIGN PATENT DOCUMENTS

WO    2007-003043 A1    1/2007
WO    2015-067440 A1    5/2015

OTHER PUBLICATIONS

Appl. No. PCT/US17/49172, filed Aug. 29, 2017, International Search Report, dated Feb. 26, 2018.
(Continued)

*Primary Examiner* — Marc C Howell
*Assistant Examiner* — Debjani Roy
(74) *Attorney, Agent, or Firm* — AdamsIP, LLC

(57) ABSTRACT

A method of manufacturing cross-corrugated support structures is provided. A mold having a molding surface with a first plurality and a second plurality of corrugations therein is used to introduce corrugations into a flexible, carbonaceous sheet. Cross-corrugations are introduced into the sheet by placing the sheet onto the molding surface, encapsulating the sheet to form a vacuum chamber, and evacuating the
(Continued)

vacuum chamber of air. As air is evacuated from the vacuum chamber, the sheet is drawn upon the molding surface causing the sheet to conform to the shape of the molding surface. Thermosetting resin is infused into the sheet and cured causing the sheet to rigidly retain the shape of the molding surface. The sheet is further reinforced by securing at least one support member to the sheet using thermosetting resin.

10 Claims, 7 Drawing Sheets

(51) Int. Cl.
*B29C 51/10* (2006.01)
*B29L 16/00* (2006.01)

(52) U.S. Cl.
CPC ........ *B29C 51/10* (2013.01); *B29C 2791/006* (2013.01); *B29L 2016/00* (2013.01)

(56) References Cited

U.S. PATENT DOCUMENTS

| | | |
|---|---|---|
| 5,449,543 A | 9/1995 | Bach et al. |
| 5,609,942 A | 3/1997 | Hemen |
| 5,797,230 A | 8/1998 | Lassen |
| 2003/0068472 A1 | 4/2003 | Benson et al. |
| 2006/0277837 A1* | 12/2006 | Wilsey ............... E04C 5/07 52/79.1 |
| 2011/0195230 A1 | 8/2011 | Hanson |
| 2012/0186165 A1 | 7/2012 | Wilsey |
| 2013/0333854 A1 | 12/2013 | Noble et al. |

OTHER PUBLICATIONS

Appl. No. PCT/US17/49172, filed Aug. 29, 2017, Written Opinion of the International Searching Authority, dated Feb. 26, 2018.
International Search Report, dated Jun. 5, 2018, for related Appl. No. PCT/US17/47792, filed Aug. 21, 2017.
Written Opinion of the International Searching Authority, dated Jun. 5, 2018, for related Appl. No. PCT/US17/47792, filed Aug. 21, 2017.

* cited by examiner

METHOD OF MANUFACTURING CROSS-CORRUGATED SUPPORT STRUCTURES

CROSS-REFERENCE TO RELATED APPLICATIONS

This application is a United States National Stage Application of PCT/US17/49172, filed Aug. 29, 2017, which claims priority to International Application No. PCT/US17/47792, filed Aug. 21, 2017, which applications are incorporated herein in entirety by reference.

FIELD OF THE DISCLOSURE

The subject matter of the present disclosure refers generally to a method of manufacturing cross-corrugated support structures.

BACKGROUND

Concrete blocks with steel beams encased therein for reinforcement are frequently used in the construction of large-scale structures, such as bridges and skyscrapers, because of the compressive and tensile strengths generally exhibited by concrete and steel. Oftentimes, the primary framework of a large-scale structure is defined by a plurality of such reinforced concrete blocks assembled together. However, concrete reinforced with steel is immensely heavy, so much so that the concrete blocks, or other structures, forming the framework of the structure generally cannot be fabricated on site. Rather, reinforced concrete components used in large-scale structures generally must be prefabricated at a designated factory or manufacturing site and subsequently transported to the construction site. Due to the weight of steel and concrete, the labor and transportation logistics associated with the manufacture and transportation of reinforced concrete is generally more complex, and thus costlier than other commonly used building materials, such as wood, aluminum, or plastic. Further contributing to this problem is the fact that the dimensions of reinforced concrete building components often prevent multiple units from being stacked during transport, thereby necessitating numerous trips from the fabrication site to the construction site and vice versa.

Other materials commonly used in construction projects that are of a lighter weight than reinforced concrete, including, but not limited to, wood, plastic, and aluminum, are generally incapable of withstanding the same compressive and/or tensile forces as reinforced concrete. Accordingly, such materials are generally unsuitable for use as key, force-bearing components in large-scale structures. Because introducing corrugations into a material generally serves to increase the tensile strength of the material in a direction running perpendicular to the corrugations, attempts have been made in the art to produce high strength-to-weight ratio materials by introducing corrugations within various metal and plastic materials. However, the materials reinforced through such efforts currently known within the art are nonetheless generally unsuitable for use in large-scale structures. This is often due to the fact that materials amenable to traditional corrugation techniques are generally not as strong as reinforced concrete, even when reinforced with corrugations.

Traditionally, the introduction of corrugations into a piece of material has been achieved through roll forming, i.e., passing the piece of material through one or more rolling dies. As the piece of material passes through the dies, the material deforms to match the contours of the rolling dies, thereby creating a series of corrugations within the material. As such, only deformable materials, i.e, materials that can be deformed by die rollers and retain such deformations, may be reinforced via corrugations using traditional methods. Thus, traditional corrugation methods cannot be used to form corrugations within certain materials exhibiting high compressive and tensile strengths that may serve as viable substitutes for reinforced concrete, such as fiber reinforced polymers.

Accordingly, there is need the art for a method of introducing corrugations into materials exhibiting high compressive and tensile strengths and creating support structures therefrom. Moreover, there is a need in the art for a method of manufacturing corrugated support structures that facilitates on-site assembly.

SUMMARY

A method of manufacturing cross-corrugated support structures is provided. A mold having a molding surface having a first plurality and a second plurality of corrugations is used to introduce corrugations into a flexible sheet. Due to the generally high tensile and compressive strengths and low weight exhibited by carbonaceous materials, the flexible sheet preferably comprises a carbonaceous material such as carbon fiber or graphene. The first and second plurality of corrugations within the molding surface are defined by a series of ridges and grooves and are oriented within the molding surface such that the first plurality of corrugations and the second plurality of corrugations intersect to establish a plurality of cross-corrugations. Cross-corrugations are introduced into the sheet by placing the sheet onto the molding surface, encapsulating the sheet to form a vacuum chamber, and evacuating the vacuum chamber of air. The vacuum chamber may be established by encapsulating the sheet with a bag such that the sheet is disposed between the molding surface and the bag when encapsulated. As the air is evacuated from the vacuum chamber, the sheet is drawn upon the molding surface, which causes the sheet to conform to the shape of the molding surface, thereby introducing a plurality of corrugations into the sheet. Thermosetting resin is infused into the sheet and cured such that sheet rigidly retains the shape of the molding surface.

To further reinforce the sheet, a support member may be secured thereto. The support member may be secured to the sheet after the sheet rigidly retains the shape of the molding surface. Prior to securing a support member to the sheet, a plurality of rigid sheets formed in the above-described manner may be stacked on top of each other and transported along with a plurality of support members to a designated worksite. Once at the worksite, one or more support members may be secured to each sheet on site, thereby forming a plurality of cross-corrugated support structures. Support members may be secured to a sheet after the sheet is infused and cured with thermosetting resin by applying additional thermosetting resin to either the sheet, the support members, or both, placing the support members on a top or a bottom side of the sheet, and curing the second application of resin to fix the support members in place. Alternatively, a support member may be secured to the sheet via resin by placing the support member on a top side of the sheet prior to infusing the sheet with resin and evacuating the air from the vacuum chamber. Alternatively, the support member may be secured to the sheet by boring a plurality of aligned bores within the sheet once the sheet has rigidly retained the shape of the molding surface and then inserting the support member through the aligned bores.

Depending on the intended application for which the support structure is being used and strength requirements necessitated thereby, the dimensions or orientations of the first and second plurality of corrugations within the molding surface, and subsequently the sheet, may vary. Moreover, the dimensions and composition of the support member may vary according to the application.

The foregoing summary has outlined some features of the method of the present disclosure so that those skilled in the pertinent art may better understand the detailed description that follows. Additional features that form the subject of the claims will be described hereinafter. Those skilled in the pertinent art should appreciate that they can readily utilize these features for designating or modifying other structures for carrying out the same purposes of the apparatus as disclosed herein. Those skilled in the pertinent art should also realize that such equivalent designs or modifications do not depart from the scope of the device of the present disclosure.

DESCRIPTION OF THE DRAWINGS

These and other features, aspects, and advantage of the present invention will become better understood with regard to the following description, appended claims, and accompanying drawings where:

DETAILED DESCRIPTION

Figure 1:
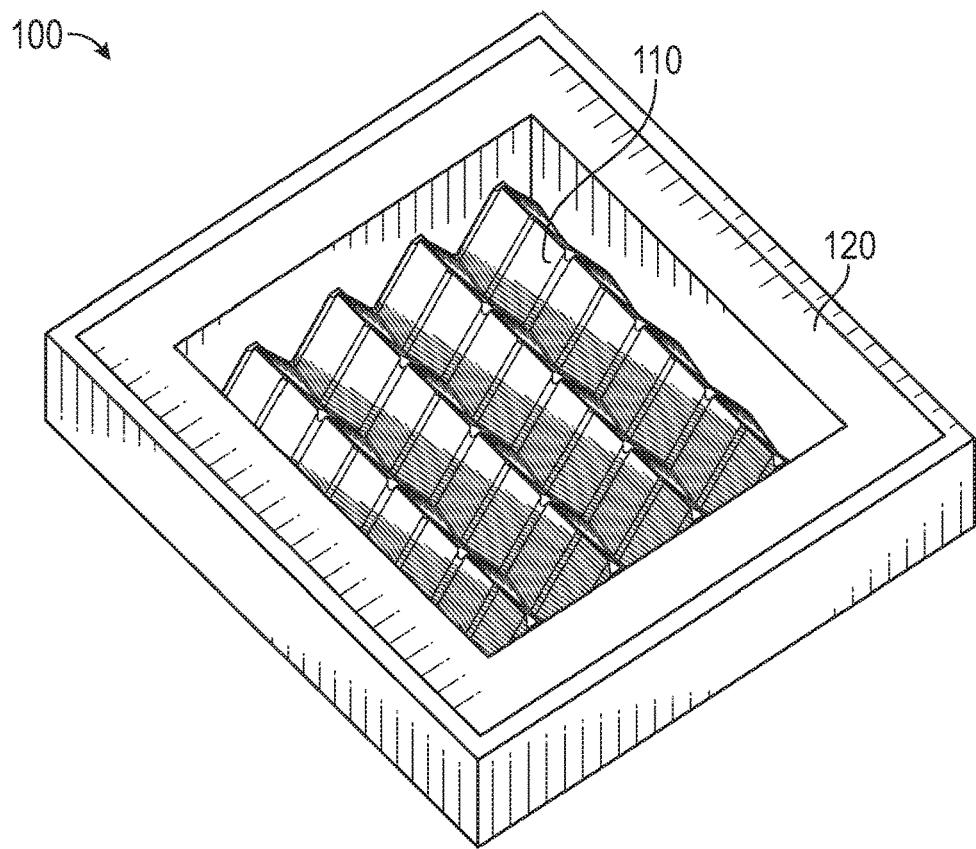
FIG. 1 is a perspective view of a mold embodying features consistent with the principles of the present disclosure.

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "rigid sheet" and grammatical equivalents thereof as used herein are understood to mean a sheet of non-malleable material which is devoid of flexibility such that the shape of the sheet cannot be bent or otherwise deformed by way of roll forming without breaking. The term "removably secured" and grammatical equivalents thereof are used herein to mean the joining of two components in a manner such that the two components are secured together, but may be detached from one another and re-secured together without requiring the use of specialized tools. The term "thermosetting resin" and grammatical equivalents thereof are understood to mean a resin that irreversibly cures through the application of suitable heat thereto, a chemical reaction, and/or subjection to suitable irradiation. As used herein, the terms "first plurality of mold corrugations", "second plurality of mold corrugations", "mold face", and grammatical equivalents thereof are understood to mean the first plurality of corrugations 112, the second plurality of corrugations 114, and the faces 116, respectively, of the molding surface 110 shown in FIG. 2. As used herein, the terms "first plurality of sheet corrugations", "second plurality of sheet corrugations", "sheet faces", and grammatical equivalents thereof are understood to mean the first plurality of corrugations 212, the second plurality of corrugations 214, and the faces 216, respectively, of the sheet 200 shown in FIG. 7.

Figure 5:
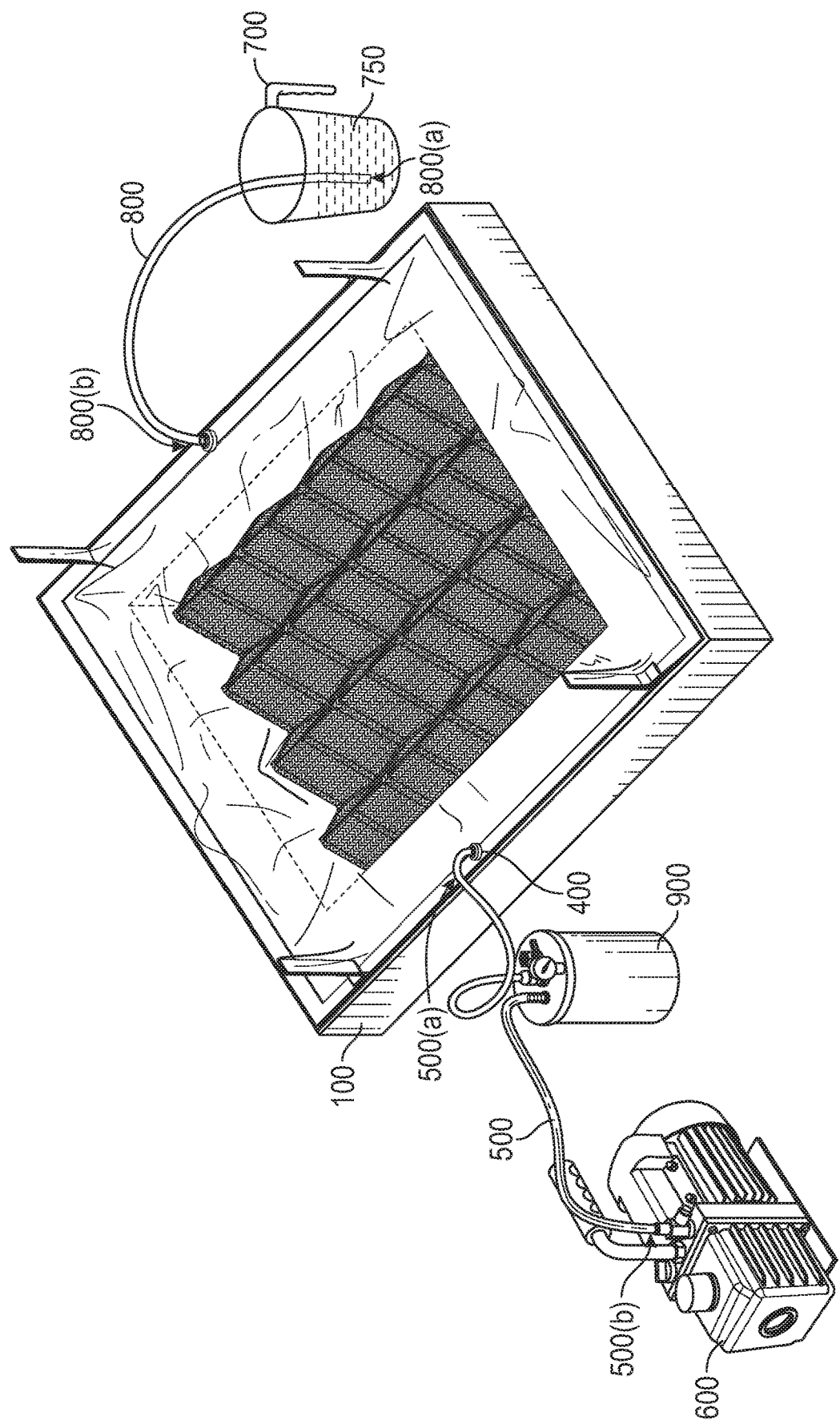
FIG. 5 is a perspective view of a mold, bag, vacuum device, vacuum tube, catch pot, resin tube, container, and thermosetting resin embodying features consistent with the principles of the present disclosure.
Figure 6:
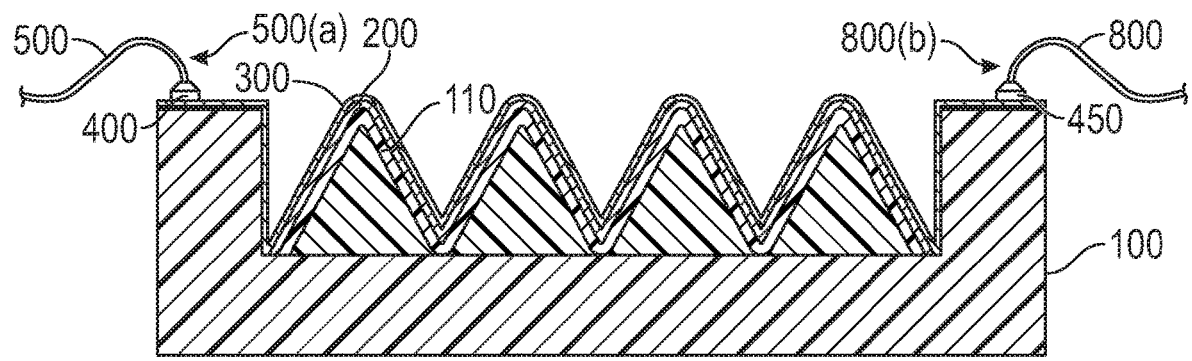
FIG. 6. is a side cross-sectional view of a mold, carbonaceous sheet, bag, and tube embodying features consistent with the principles of the present disclosure.
Figure 7:
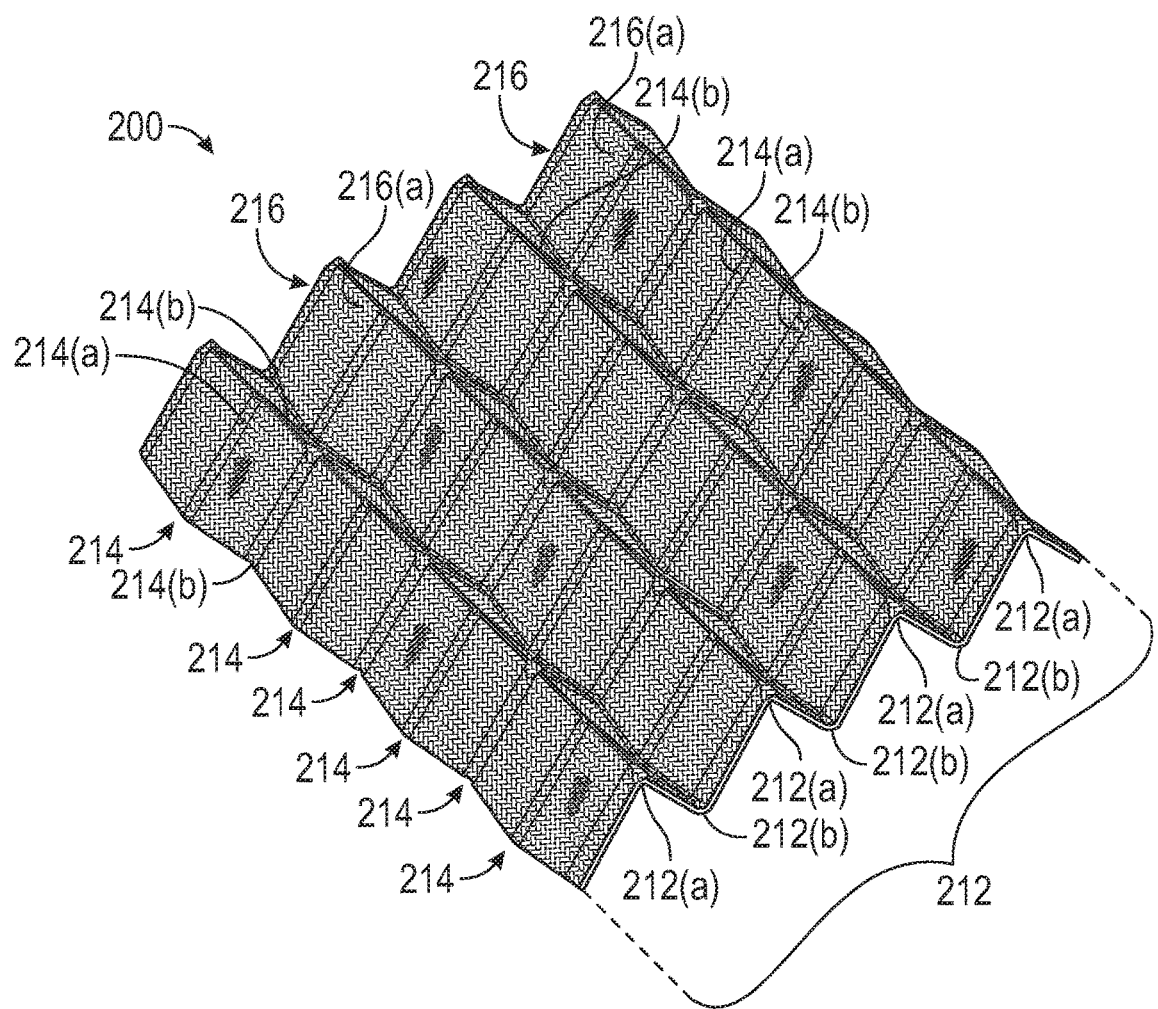
FIG. 7 is a perspective view of a cross-corrugated carbonaceous sheet embodying features consistent with the principles of the present disclosure.
Figure 8:
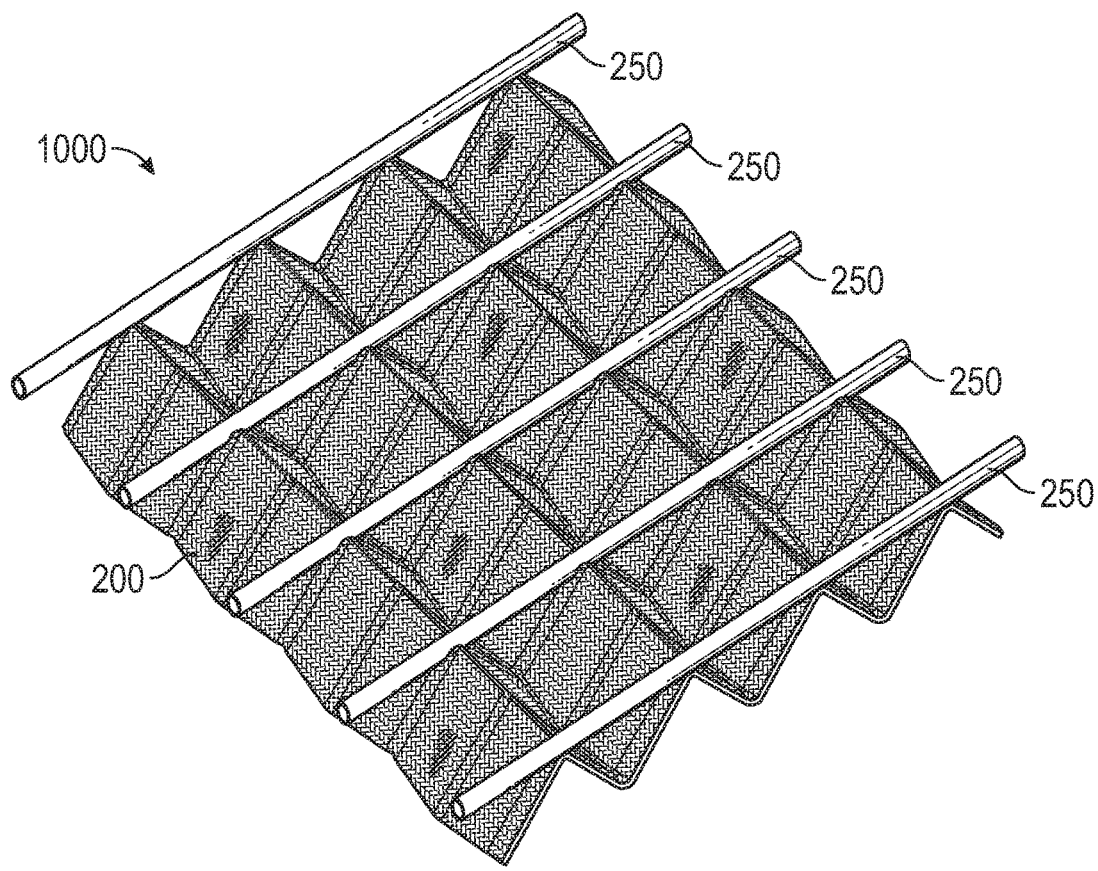
FIG. 8 is a perspective view of a cross-corrugated support structure embodying features consistent with the principles of the present disclosure.
Figure 9:
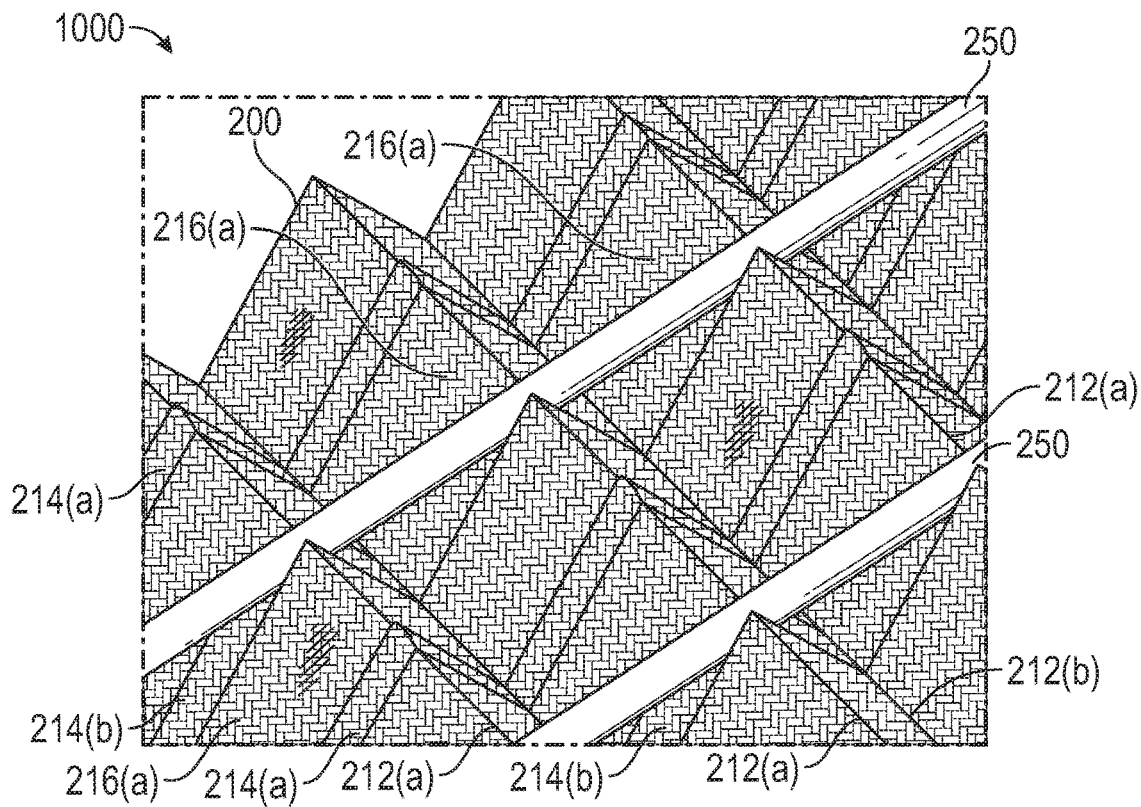
FIG. 9 is a partial magnified view of a support structure embodying features consistent with the principles of the present disclosure.
Figure 10:
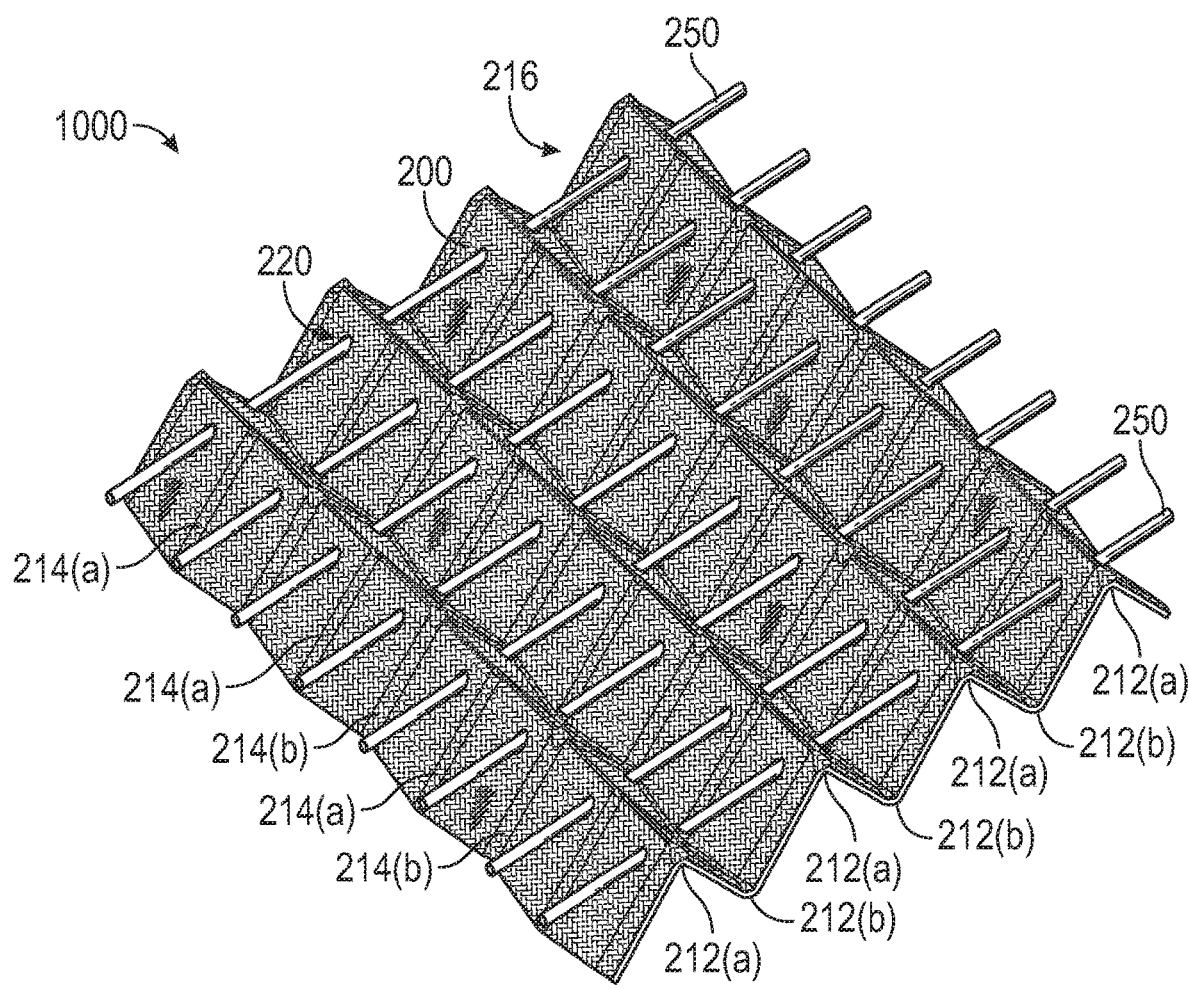
FIG. 10 is a perspective view of a support structure embodying features consistent with the principles of the present disclosure.

Turning now to the drawings, FIGS. 1-10 illustrate certain components, materials, and devices that may be utilized in the method for manufacturing cross-corrugated support structures disclosed herein. As best shown in FIGS. 8-10, the method of the present disclosure may be utilized to produce a cross-corrugated support structure 1000 exhibiting a high-strength to weight ratio such that the support structure 1000 may be used in place of heavier building materials such as concrete reinforced with steel. To this end, the method of the present disclosure produces a support structure 1000 comprising a sheet 200 having a first plurality of corrugations 212 and a second plurality of corrugations 214 extending the length of the sheet 200, as shown in FIGS. 7-10. The first plurality of corrugations 212 and the second plurality of corrugations 214 are oriented within the sheet 200 such that the first and second plurality of corrugations 212, 214 intersect, thereby creating a plurality of cross-corrugations throughout the sheet 200, as best shown in FIG. 7. The first plurality of corrugations 212 within the sheet 200 are defined by a series of primary ridges 212(a) and primary grooves 212(b), and the second plurality of corrugations 214 within the sheet 200 are defined by a series of secondary ridges 214(a) and secondary grooves 214(b), as further shown in FIG. 7.

Each corrugation within the first and second plurality of corrugations 212, 214 within the sheet 200 serves to increase the tensile and compressive strengths of the sheet 200 in a direction perpendicular to the direction in which each respective corrugation extends. For instance, the first plurality of corrugations 212 within the sheet 200 may extend longitudinally and the second plurality of corrugations 214 may extend latitudinally within a plane of the sheet 200. In such embodiments, the first plurality of corrugations 212 within the sheet 200 serve to increase the tensile and compressive strength of the sheet 200 in a longitudinal direction, and the second plurality of corrugations 214 within the sheet serve to increase the tensile and compressive strength of the sheet 200 in a latitudinal direction.

For additional reinforcement, the support structure may further comprise at least one support member 250 secured to the sheet 200. The support member 250 may be elongated, e.g., an elongated rod, and transversely secured to the sheet 200 such that the support member 250 bridges the grooves and/or ridges of the first plurality of corrugations 212 within the sheet 200, as shown in FIGS. 8-10. A plurality of elongated support members 250 may be secured to a top side and/or a bottom side of the sheet 200 to define a plane to which other structures or objects may be secured or on which other structures or objects may rest. In addition, the support structure may optionally comprise two sheets 200 secured together.

To provide for improved tensile and compressive strengths over those exhibited by corrugated sheets currently known in the art—e.g., aluminum, stainless steel, and various plastics—the cross-corrugated sheet 200 preferably comprises a carbonaceous material. Due to the tensile and compressive strengths, fatigue properties, corrosion-resistance, and reduced weight of carbon fiber and graphene, the sheet 200 preferably comprises carbon fiber or graphene sheets or combinations thereof. However, because certain carbonaceous materials, like carbon fiber and graphene sheets, are non-deformable such that they cannot be deformed by die rollers and subsequently retain such deformations, such materials are not suitable for use with traditional roll-forming corrugation techniques. As such, the method of the present disclosure departs from corrugation methods and techniques commonly employed and known in the art by introducing a plurality of cross corrugations into a flexible, carbonaceous sheet via the inventive method of manufacture disclosed herein.

Figure 2:
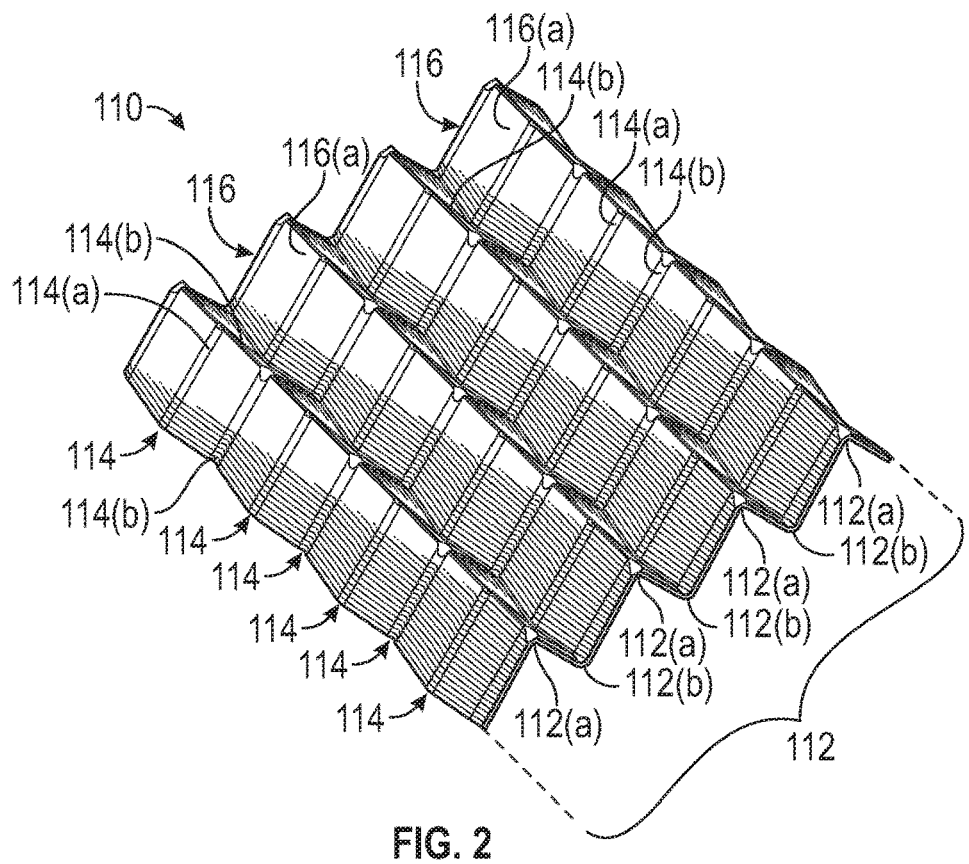
FIG. 2 is a perspective view of a molding surface embodying features consistent with the principles of the present disclosure.

As shown best in FIG. 1, the method of the present disclosure requires a mold 100 to be provided. The mold 100 has a molding surface 110 which serves to introduce a plurality of corrugations into a flexible sheet 200 of material. In addition to the molding surface 110, the mold 100 may further comprise a flange 120 to which a bag 300 or other material may be secured in the same or similar manner as disclosed herein. FIG. 2 shows the molding surface 110 isolated from the other portions of the mold 100. As shown in FIG. 2, the molding surface 110 has a first plurality of corrugations 112 and a second plurality of corrugations 114 therein. As further shown in FIG. 2, the first plurality of corrugations 112 within the molding surface 110 is defined by a series of primary ridges 112(a) and a series of primary grooves 112(b) extending a length of the molding surface 110 in a first direction. The corrugations defining the first plurality of corrugations 112 within the molding surface 110 preferably alternate between corrugations comprising primary ridges 112(a) and corrugations comprising primary grooves 112(b) such that a corrugation comprising a primary groove 112(b) immediately follows a corrugation comprising a primary ridge 112(a). The alternating primary ridges 112(a) and primary grooves 112(b) cause the molding surface 110 to retain a generally wave-like configuration in the first direction. Each primary ridge 112(a) is connected to an adjacent primary groove 112(b) within the molding surface 110 via a face 116 that extends therebetween. Depending on the intended application, the shape of the primary ridges 112(a) and primary grooves 112(b) within the molding surface 110 may vary. For instance, the portion of the primary ridges 112(a) and primary grooves 112(b) disposed between the corrugations of the second plurality of corrugations 114 within the molding surface 110 may retain a peaked shape, as shown in FIGS. 1-2 and 6. Alternatively, the primary ridges 112(a) and primary grooves 112(b) within the molding surface 110 may retain a rounded shape or a squared shape (not shown).

The second plurality of corrugations 114 within the molding surface 110 are defined by a series of secondary ridges 114(a) and a series of secondary grooves 114(b) extending in a second direction that intersects with the first direction to which the first plurality of corrugations 112 extend through the molding surface 110. The intersection of the first and second plurality of corrugations 112, 114 establishes a plurality of cross corrugations within the molding surface 110. For instance, as shown best in FIGS. 1-2, the first plurality of corrugations 112 may extend longitudinally along a length of the molding surface 110 and the second plurality of corrugations 114 may extend latitudinally along a length of the molding surface 110 such that the first and second plurality of corrugations 112, 114 intersect perpendicularly. One of skill in the art will appreciate, however, that the direction in which the first plurality of corrugations 112 and the direction in which the second plurality of corrugations 114 extend and subsequently intersect within the molding surface 110 may vary without departing from the inventive subject matter disclosed herein. As shown best in FIG. 2, each corrugation within the second plurality of corrugations 114 within the molding surface 110 initially ascends towards each primary ridge 112(a) and subsequently descends towards each primary groove 112(b). Accordingly, each corrugation within the second plurality of corrugations 114 intersects the face 116 extending between each primary ridge 112(a) and primary groove 112(b), thereby dividing each face 116 within the molding surface 110 into a plurality of sub-faces 116(a).

The arrangement of secondary ridges 114(a) and secondary grooves 114(b) within each corrugation of the second plurality of corrugations 114 may vary depending on the application. For instance, each corrugation within the second plurality of corrugations may comprise a series of linearly alternating secondary ridges 114(a) and secondary grooves 114(b), as shown best in FIGS. 1-2. Each corrugation within the second plurality of corrugations 114 within the molding surface 110 may comprise a secondary ridge 114(a) that ascends towards each primary ridge 112(a) and that subsequently converts to a secondary groove 114(b) as the corrugation descends towards a primary groove 112(b). Alternatively, each corrugation within the second plurality of corrugations 114 within the molding surface 110 may comprise either a continuous secondary ridge 114(a) or a secondary groove 114(b), as shown in FIG. 9. Thus, the corrugations making up the second plurality of corrugations may be arranged in an alternating pattern such that a corrugation comprising a continuous secondary ridge 114(*a*) is adjacent to a corrugation comprising a continuous secondary groove 114(*b*), as further shown in FIG. 9. Alternatively, the corrugations making up the second plurality of corrugations 114 may be arranged within the sheet 110 such that a corrugation comprising a continuous secondary ridge 114(*a*) or a continuous secondary groove 114(*b*) may be directly adjacent to a corrugation comprising a continuous ridge 114(*a*) or continuous secondary groove 114(*b*), respectively. Like the primary ridges 112(*a*) and primary grooves 112(*b*), the shape of the secondary ridges 114(*a*) and secondary grooves 114(*b*) within the molding surface 110 may vary. As shown in FIG. 9, the secondary ridges 114(*a*) and secondary grooves 114(*b*) within the molding surface 110 may be substantially rounded. Alternatively, secondary ridges and grooves 114(*a*), 114(*b*) may retain a peaked shape or a squared shape.

Figure 3:
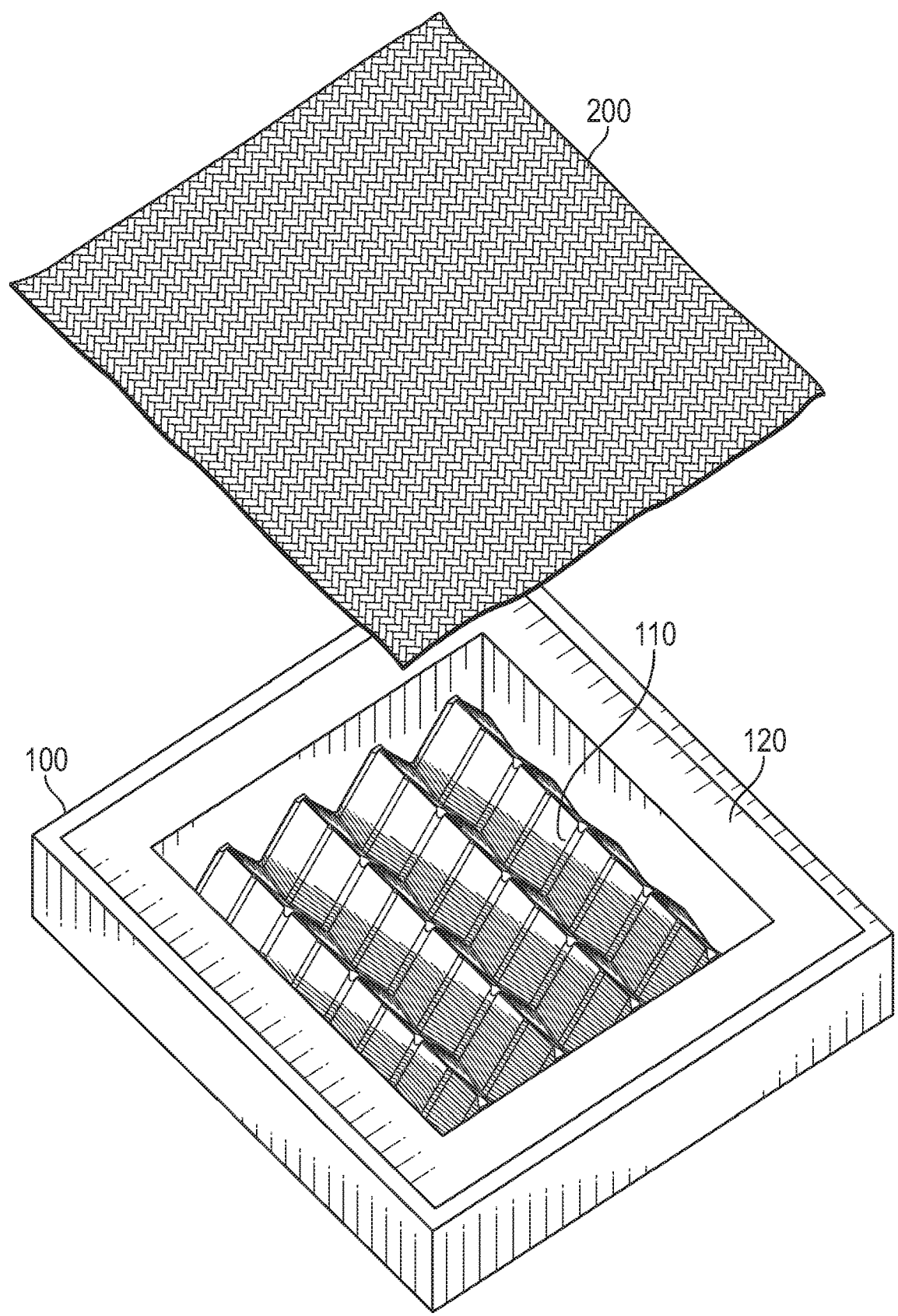
FIG. 3 is a perspective view of a mold and a carbonaceous sheet embodying features consistent with the principles of the present disclosure.
Figure 4:
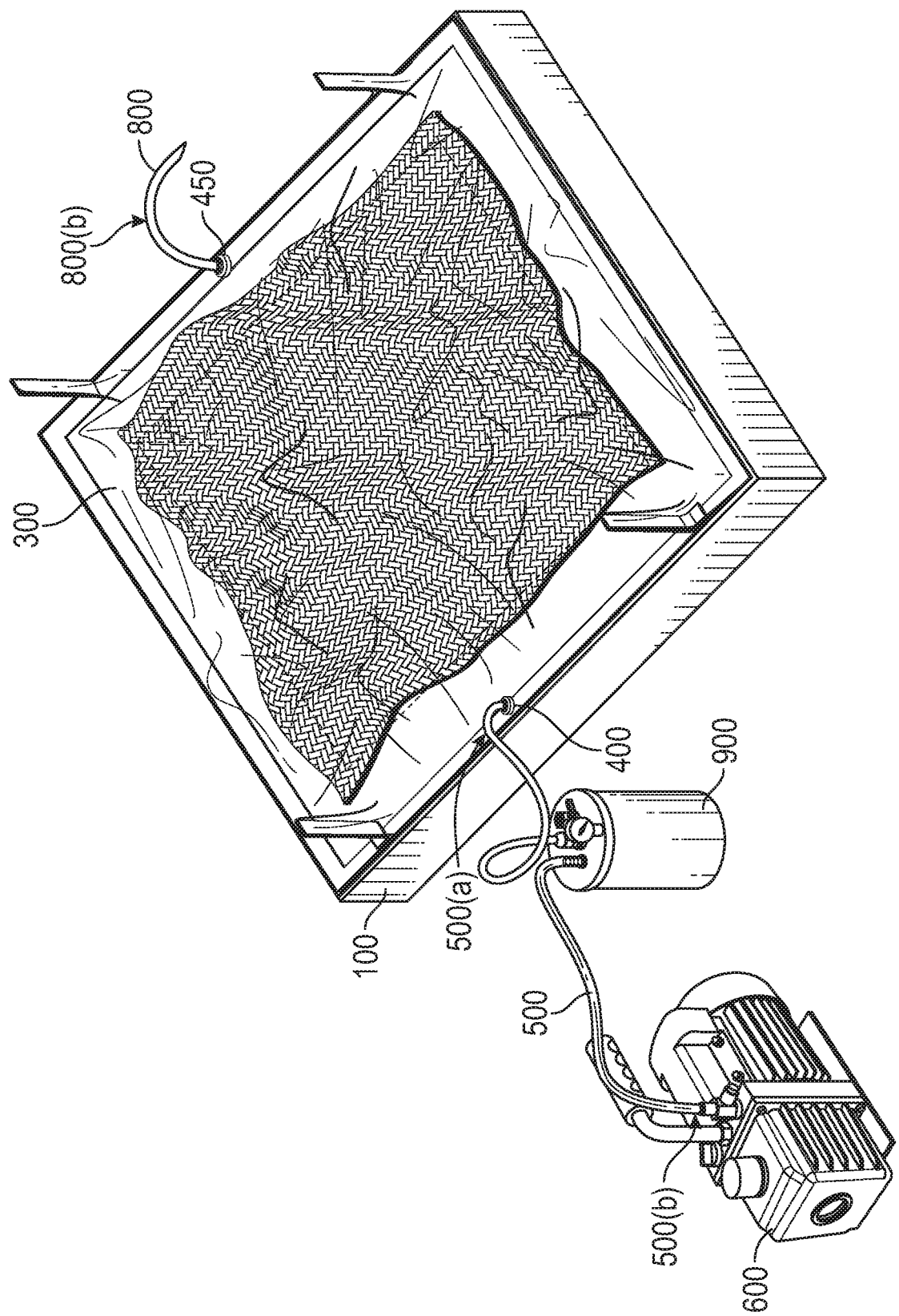
FIG. 4 is a perspective view of a mold, a bag, a vacuum device, a vacuum tube, a resin tube, and a catch pot embodying features consistent with the principles of the present disclosure.

As shown in FIGS. 3-4, at least one flexible sheet 200 of material is placed on the mold 100 such that the sheet 200 of material rests upon the molding surface 110. To provide for improved tensile and compressive strengths over those exhibited by corrugated sheets currently known in the art—e.g., aluminum, stainless steel, and various plastics—the sheet 200 preferably comprises a carbonaceous material. Preferably, the sheet 200 comprises carbon fiber, graphene, or combinations thereof due to the tensile and compressive strengths, fatigue properties, corrosion-resistance, and reduced weight exhibited by such materials. In some instances, the sheet 200 may comprise multiple carbonaceous sheets to further reinforce the cross-corrugated support structure 1000 produced from the method disclosed herein. For instance, the sheet 200 may comprise a first carbon fiber or graphene sheet placed on the molding surface 110 and a second carbon fiber or graphene sheet placed on top of the first carbon fiber or graphene sheet. Additional carbon fiber or graphene sheets may be applied in the same manner for added reinforcement. One of skill in the art will appreciate, however, that other suitable flexible, carbonaceous materials may be used without departing from the inventive subject matter disclosed herein. The dimensions of the sheet 200 are preferably such that the perimeter defined by the sheet 200 is greater than the perimeter of the molding surface 110 to ensure that the sheet 200 covers the entirety of the molding surface 110 even when drawn downwardly thereupon in the manner described herein. To prevent the sheet 200 from shifting or otherwise moving during certain method steps disclosed herein, the sheet 200 may be taped or otherwise secured to the mold 100. Optionally, a releasing agent may be applied to the molding surface 110 prior to placing the sheet 200 on top of the molding surface 110 to prevent the sheet 200 from adhering to the molding surface 110.

As shown in FIGS. 4-6, the sheet 200 is subsequently encapsulated between the molding surface 110 and a bag 300 by securing the outer edges of the bag 300, or a portion of the bag substantially near the outer edges of the bag 300, to the flange 120 of the mold 100. The bag 300 is preferably secured to the flange 120 such that an airtight seal exists between the molding surface 110 and sheet 200 adjacent a first side of the bag 300 and the external environment adjacent a second side of the bag 300. Thus, when secured to the flange 120 in the foregoing manner, the bag 300 serves to establish a vacuum chamber. The bag 300 may be secured to the flange 120 of the mold 100 via sealant tape, adhesives, or using any other suitable materials, tools, or instruments. The dimensions of the bag 300 are preferably such that the bag 300 may be drawn downwardly upon the sheet 200 and conform to the contours of the molding surface 110, as shown in FIG. 6. The bag 300 may comprise a plastic material. However, one of skill in the art will appreciate that the bag 300 may comprise other suitable flexible materials without departing from the inventive subject matter disclosed herein. Optionally, a peel-ply sheet of material (not shown) may be placed directly on top of the sheet 200 such that the peel-ply covers the entirety of the top surface of the sheet 200 prior to encapsulation. In this way, the peel-ply sheet may act as an intermediate layer between the sheet 200 and the bag 300 to prevent adhesion between the sheet and bag. The peel-ply sheet is preferably a synthetic cloth configured to peel away from the top surface of the sheet 200 after certain applications of thermosetting resin 750 disclosed herein have cured.

To introduce the first and second plurality of corrugations 112, 114 within the molding surface 110 into the sheet 200, the vacuum chamber is evacuated of air contained therein. FIG. 4 illustrates the sheet 200 and bag 300 prior to the air within the vacuum chamber being evacuated. FIG. 5 illustrates the sheet 200 and bag 300 after the air within the vacuum chamber has been evacuated. As the air is evacuated from the vacuum chamber, the bag 300 is drawn towards the molding surface 110, thereby drawing the sheet 200 downwardly upon the molding surface 110, as shown best in FIGS. 5-6. FIG. 6 shows a cross-sectional view of the mold 100 including the molding surface 110, the sheet 200, the bag 300, as well as a vacuum tube 500 and a resin tube 800 as shown in FIG. 5. Specifically, FIG. 6 provides a cross-sectional view of a portion of the molding surface 110 located between two adjacent corrugations of the second plurality of corrugations 114 within the molding surface 110 and shows the sheet 200 and bag 300 conforming to the contours of that portion of the molding surface 110.

As the sheet 200 is drawn upon the molding surface 110, the sheet 200 conforms to the shape of the molding surface 110, thereby introducing the first plurality and the second plurality of corrugations 112, 114 and faces 116 extending therebetween into the sheet 200, as shown best in FIGS. 6 and 7. As shown in FIGS. 4 and 5, air within the vacuum chamber may be evacuated therefrom utilizing a vacuum device 600 configured to provide suction when activated. The vacuum device 600 is preferably connected to the bag 300 such that when the vacuum device 600 is activated the suction provided by the vacuum device 600 causes any air within the vacuum chamber—air present between the molding surface 110 and the bag 300—to be evacuated therefrom. As further shown in FIGS. 4-5, the vacuum device 600 may be connected to the bag 300 via a vacuum tube 500. Thus, a first end 500(*a*) of the vacuum tube 500 may be disposed within the vacuum chamber and a second end 500(*b*) of the vacuum tube 500 may be connected to the vacuum device 600, as further shown in FIGS. 4-5.

To allow entry of the first end 500(*a*) of the vacuum tube 500 into the vacuum chamber, the bag 300 may have a vacuum port 400 of sufficient size such that the first end 500(*a*) of the vacuum tube 500 may be inserted therethrough. Preferably, an airtight seal exists between the vacuum tube 500 and the vacuum port of the bag 300 when the first end 500(*a*) of the vacuum tube 500 is disposed within the vacuum chamber. To facilitate an airtight seal between the vacuum tube 500 and the vacuum port 400, the vacuum port 400 may comprise a coupler or gasket designed to provide an airtight seal. Alternatively, the vacuum device 600 may be connected directly to the bag 300. For instance, a portion or component of vacuum device 600 may have a first interlocking member, e.g., male threading, and the vacuum port of the bag 300 may have a second interlocking member, e.g., female threading, such that the vacuum device 600 may be secured to the bag 300 by interlocking the first and second interlocking members. One of skill in the art will further appreciate that any other suitable device, instrument, or method may be used to evacuate the air within the vacuum chamber without departing from the inventive method disclosed herein.

As shown best in FIG. 5, the sheet 200 is infused with thermosetting resin 750. Thermosetting resins 750 which may be used include, but are not limited to, epoxy, vinyl ester, polyester, polyurethane, or combinations thereof. As further shown in FIG. 5, a container 700 and resin tube 800 may be utilized during infusion. Thermosetting resin 750 may be placed within the container 700 and a first end 800(a) of the resin tube 800 may be disposed within the thermosetting resin 750 in the container. A second end 800(b) of the resin tube may be disposed within the vacuum chamber. To allow entry of the second end of the resin tube 800 into the vacuum chamber, the bag 300 may have a resin port 450 of sufficient size such that the second end 800(b) of the resin tube 800 may be inserted therethrough. Preferably, an airtight seal exists between the resin tube 800 and the resin port 450 when the second end of the resin tube 800 is disposed within the vacuum chamber. To provide an airtight seal between the resin tube 800 and the resin port 450, the resin port 450 may comprise a coupler or gasket designed to provide an airtight seal.

When the vacuum device 600 is activated to provide suction, the suction provided by the vacuum device 600 draws the thermosetting resin 750 from the container 700 through the resin tube 800 onto the sheet 200. In some instances, an infusion mesh (not shown) configured to evenly distribute liquid 750 across the sheet during vacuum infusion may be disposed between the sheet 200 and the bag 300 to facilitate even distribution of thermosetting resin 750 across the sheet 200. As suction is applied by the vacuum device 600, some aerated thermosetting resin 750 may be drawn into the vacuum tube 500. As such, a catch pot 900 configured to receive the thermosetting resin 750 drawn into the vacuum tube 500 may be utilized, as shown in FIG. 5. As further shown in FIG. 5, the catch pot 900 may bisect the vacuum tube 500. Thus, the vacuum tube 500 may comprise two portions—a first half extending from the vacuum chamber to the catch pot 900 and a second half extending from the catch pot 900 to the vacuum device 600. Preferably, the sheet 200 is infused with thermosetting resin 750 after the vacuum chamber has been evacuated of air contained therein. Alternatively, the sheet 200 may be infused with thermosetting resin 750 prior to the evacuation of air within the vacuum chamber or concurrently with the process of air evacuation.

Once the sheet 200 is drawn downwardly upon the molding surface 110 and infused with thermosetting resin 750, the thermosetting resin 750 is cured until the sheet rigidly retains the shape of the molding surface 110. To promote curing of the thermosetting resin 750, the resin may be subjected to heat. Depending on the type of thermosetting resin 750 used, the temperature to which the thermosetting resin 750 is subjected to may vary. For instance, some thermosetting resins 750 may require subjection to temperatures of approximately 392 degrees Fahrenheit (200 degrees Celsius) or greater, whereas other thermosetting resins 750 may cure at room temperature. Alternatively, co-reactants (hardeners) formulated to promote curing of the thermosetting resin 750 may be admixed with the thermosetting resin 750 to cause a chemical reaction that causes the thermosetting resin 750 to cure. Depending on the intended application and/or curing time desired, the type of co-reactant used and the ratio of co-reactant to thermosetting resin may vary. Alternatively, the thermosetting resin may be subjected to irradiation to promote curing. Alternatively, the thermosetting resin may be cured by the application of heat, admixing a co-reactant, or otherwise and then subsequently post-cured by subjecting the thermosetting resin to elevated temperatures. The thermosetting resin 750 within the sheet 200 may be permitted to cure for a period of twelve hours or more prior to post-curing the resin-infused sheet 200. After the thermosetting resin 750 has cured, the sheet 200 may be removed from the molding surface 110.

Once the thermosetting resin 750 is cured, the sheet 200 rigidly retains the shape formed during evacuation of the vacuum chamber. That is, the sheet 200 has a first plurality of corrugations 212, a second plurality of corrugations 214, faces 216, and sub-faces 216(a) corresponding to the first plurality of corrugations 112, the second plurality of corrugations 114, faces 116, and sub-faces 116(a), respectively, of the molding surface 110, as shown in FIGS. 7-10. The second plurality of corrugations 214 within the sheet 200 illustrated in FIGS. 7-8 and 10 correspond to the molding surface 110 shown in FIG. 2, wherein each corrugation of the second plurality of corrugations 114 of the molding surface 100 comprises a series of linearly alternating secondary ridges 114(a) and secondary grooves 114(b). The second plurality of corrugations 214 within the sheet 200 shown in FIG. 9 correspond to a molding surface 110 wherein each corrugation of the second plurality of corrugations 114 comprises either a continuous secondary ridge 114(a) or a continuous secondary groove 114(b). Thus, the size of sheet 200 as well as the number, dimensions, and orientations of the corrugations of the first plurality of corrugations and of the second plurality of corrugations within the sheet may be adjusted by changing the design of the molding surface 110. Thus, a variety of molds having molding surfaces designed for an intended application may be developed and utilized in the above-described manner. Accordingly, the method of the present disclosure may serve to convert a flexible carbonaceous sheet not suitable for traditional roll forming corrugation techniques, as shown in FIG. 3, into a cross-corrugated rigid sheet, as shown in FIGS. 7-10.

To further reinforce the sheet 200, at least one support member 250 may be secured thereto, as shown in FIGS. 8-10. To reduce the overall weight of the support structure 1000, the support member 250 may be elongated such that the support member 250 does not cover the entirety of a top or bottom side of the sheet 200 when secured thereto. The use of an elongated support member 250 may also serve to leave the first and second plurality of corrugations 212, 214 within the sheet 200 at least partially exposed during use of the support structure 1000. The support member 250 preferably comprises a rigid elongated member such as a rod, as shown in FIGS. 8-10. Alternatively, the support member 250 may comprise a bar. The elongated support member 250 preferably comprises a rigid metal material, such as a high-carbon steel. The elongated support member 250 may comprise a steel that is greater than 0.25% carbon by weight. However, one of skill in the art will appreciate that the elongated support member 250 may comprise other suitable materials including, but not limited to, various other types of metals, plastic, wood, stone, or combinations thereof without departing from the inventive subject matter disclosed herein. Alternatively, the support member 250 may comprise a faceplate having an area that encompasses the entirety of the top side and/or bottom side of the sheet 200 when secured thereto in order to accommodate applications requiring the top and/or bottom side of the sheet 200 to be covered. Alternatively, the support member 250 may comprise an elongated flexible strap. As best shown in FIGS. 8-10, the support structure 1000 may have a plurality of support members 250 secured to the sheet 200.

The support member 250 may be secured to the sheet 200 using thermosetting resin 750. For instance, support members 250 may be secured to the sheet by placing each support member 250 on a top side of the sheet 200 prior to infusing the sheet with thermosetting resin 750 and evacuating the vacuum chamber. In this case, as the air within the vacuum chamber is evacuated, the bag 300 presses the support members 250 downwardly upon the top side of the sheet 200 and the thermosetting resin 750 infused into the sheet 200 secures the support members 250 in place once cured. The support members 250 may be placed directly on top of the flexible, carbonaceous sheet 200 before the sheet 200 is encapsulated by the bag 300.

Alternatively, support members 250 may be secured to the sheet 200 by applying a second application of thermosetting resin 750 to the sheet 200 and/or the support members 250 after a first application of thermosetting resin 750 has been infused into the sheet and cured to harden the sheet 200 into a rigid shape, as described above. In such instances, the support members 250 may be secured to the sheet 200 by placing the support members 250 on a top side and/or a bottom side of the sheet 200, applying thermosetting resin to the sheet 200 and/or support members 250, and curing the applied resin such that the support members 250 become affixed to the sheet 200.

Because the support members 250 may be secured to the sheet 200 via thermosetting resin 750, the support structure 1000 produced by application of the method of the present disclosure may be made in piecemeal fashion. For instance, prior to securing support members 250 to the sheet 200, a plurality of cross-corrugated rigid sheets 200, as best shown in FIG. 7, formed in the manner described herein, may be manufactured, subsequently stacked on top of one another, and transported to a designated worksite. Once at the worksite, one or more support members 250 may then be secured to each of the transported sheets 200 via thermosetting resin 750 to create a plurality of support structures 1000 on site. To limit the amount of equipment transported from the site where the cross-corrugated sheet 200 is manufactured to the worksite where the support members 250 are to be secured, the method of the present disclosure may utilize multiple molds 100, vacuum devices 600, bags 300, vacuum tubes 500, catch pots 900, containers 700, thermosetting resins 750, and/or resin tubes 800. For instance, a mold 100, a first bag 300, a first vacuum tube 500, a first vacuum device 600, a first container 700, a first batch of thermosetting resin 750, and a first resin tube 800 may be present at a manufacturing site and used to convert the flexible, carbonaceous sheet 200, as shown in FIG. 3, into the rigid cross-corrugated sheet 200 shown in FIG. 7. A second bag, a second vacuum tube, a second vacuum device, and a second batch of thermosetting resin may be located at a remote worksite and used to secure support members 250 to the sheet 200. In this case, the support members 250 may be secured to the sheet 200 by placing the support members 250 on the top side and/or bottom side of the sheet 200. The sheet 200 and support members 250 are encapsulated by the second bag to form a second vacuum chamber and the second batch of thermosetting resin is applied to at least one of the sheet 200 and the support members 250. The second vacuum device is subsequently activated to evacuate the air present within the second vacuum chamber, thereby drawing the support members 250 to at least one of the top side and the bottom side of the sheet 200. The resin applied from the second batch of thermosetting resin may then be cured to rigidly secure the support members 250 to the sheet 200 in a fixed position.

The support members 250 may be secured to the sheet 200 such that the support members 250 are equidistantly spaced with respect to each other. Alternatively, the support members 250 may be spaced at non-equidistant intervals. The support members 250 may be secured to a top side of the sheet 200 such that each support member 250 is transversely secured to each primary ridge 212(a) on the top side of the sheet 200 and bridges each primary groove 212(b), as shown in FIGS. 8-9. Similarly, the support members 250 may be secured to the bottom side of the sheet 200 such that each support member 250 is transversely secured to each primary groove 212(b) on the bottom side of the sheet 200 and bridges each primary ridge 212(a). Alternatively, the support members 250 may retain a wave-like shape generally matching the shape formed by the first plurality of corrugations 212 in the first direction. In this case, the support members 250 may be secured to the sheet 200 such that the support members 250 are secured to each face 216 extending between the primary ridges 212(a) and primary grooves 212(b) within the sheet 200.

The support members 250 may be secured to the sheet 200 such that the support members 250 are disposed between the corrugations of the second plurality of corrugations 214 within the sheet 200. Preferably, the support members 250 are secured, at least partially, within the corrugations of the second plurality of corrugations 214 within the sheet 200, as shown in FIGS. 8 and 9. In instances where each corrugation of the second plurality of corrugations 214 within the sheet 200 comprises a continuous secondary ridge 214(a) or a continuous secondary groove 214(b), the portion of the secondary grooves 214(b) on the top side of the sheet 200 may form a channel in which a support member 250 may be partially housed, as shown in FIG. 9. The portion of the secondary ridges 214(a) on the bottom side of the sheet 200 may similarly form a channel in which each support member 250 may be partially housed. The depth of the channels formed by the secondary ridges 214(a) and secondary grooves 214(b) are preferably such that the support members 250 are flush with the apex of the primary grooves 212(b) and the primary ridges 212(a), respectively, when secured therein, as best shown in FIG. 9. Depending on the molding surface 110, the sheet 200 may have an additional grooved section across the apex of each primary ridge 212(a) where a support member 250 may be installed, as shown in FIG. 7. The grooved section may have a depth greater than that of a secondary groove 214(b) so that the support members 250 are flush with the apex of the primary ridge 212(a) when secured thereto.

A plurality of bores 220, or openings, may be bored within the sheet 200 once the sheet 200 rigidly retains the shape of the molding surface in order to reduce the overall weight of the support structure 1000, as shown in FIG. 10. Alternatively, the plurality of bores 220 may be bored into the sheet 200 while the sheet 200 still retains a flexible configuration. Bores 220 may be formed in the rigid, cross-corrugated sheet 200 using a drill. However, one of skill in the art will appreciate that any instrument or device suitable for forming a bore 220 in a rigid, carbonaceous sheet may be used. In some applications, the bores 220 within the sheet 200 may facilitate drainage from a first surface area to pass through the sheet 200 to a second surface or area. Each of the adjacent faces 216 extending between the primary ridges 212(a) and the primary grooves 212(b) may have at least one bore 220 extending therethrough. The bores 220 extending through each face 216 are preferably aligned such that a support member 250, such as an elongated rod, may be secured to the sheet 200 by inserting the support member 250 through the aligned bores 220. As shown in FIG. 10, each sub-face 216(a) within the sheet 200 may have a bore 220 extending therethrough. The bore 200 of each sub-face 216(a) is aligned with the bore 130 extending through an opposite, adjacent sub-face 216(a) such that each support member 250 within a plurality of support members 250 may be secured to the sheet 200 by inserting the support member 250 through a series of aligned bores 220, as further shown in FIG. 10.

The present disclosure provides a method of manufacturing cross-corrugated support structures in accordance with the independent claims. Preferred embodiments of the invention are reflected in the dependent claims. The claimed invention can be better understood in view of the embodiments described and illustrated in the present disclosure, viz. in the present specification and drawings. In general, the present disclosure reflects preferred embodiments of the invention. The attentive reader will note, however, that some aspects of the disclosed embodiments extend beyond the scope of the claims. To the extent that the disclosed embodiments indeed extend beyond the scope of the claims, the disclosed embodiments are to be considered supplementary background information and do not constitute definitions of the invention per se.

It is understood that versions of the inventive subject matter of the present disclosure may come in different forms and embodiments. Additionally, it is understood that one of skill in the art would appreciate these various forms and embodiments as falling within the scope of the inventive subject matter disclosed herein.

What is claimed is:

1. A method of manufacturing a cross-corrugated support structure, said method comprising the steps of:
   providing a mold having a molding surface,
   the molding surface being a continuous surface having a first plurality of corrugations and a second plurality of corrugations,
      the first plurality of corrugations being defined by a series of alternating primary ridges and primary grooves extending a length of the molding surface in a first direction,
         wherein each primary ridge and primary groove has a face extending therebetween,
      the second plurality of corrugations being defined by a series of secondary ridges and secondary grooves extending a length of the molding surface in a second direction intersecting with the first direction such that each corrugation within the second plurality of corrugations intersects the face extending between each primary ridge and primary groove, wherein each secondary ridge and secondary groove is disposed on a surface of the face extending between each primary ridge and primary groove;
   placing a flexible carbonaceous sheet onto the molding surface;
   encapsulating the sheet with a bag to form a vacuum chamber,
      the sheet being disposed between the molding surface and the bag when encapsulated;
   infusing the sheet with a thermosetting resin;
   evacuating the vacuum chamber of air contained therein, thereby drawing the sheet upon the molding surface such that the sheet conforms to the shape of the molding surface;
   curing the resin such that the sheet rigidly retains the shape of the molding surface; and
   securing a support member to the sheet after the sheet rigidly retains the shape of the molding surface, wherein the step of securing the support member to the sheet comprises:
      applying an application of thermosetting resin to at least one of the sheet and the support member;
      placing the support member on at least one of a top side and a bottom side of the sheet; and
      curing the application of resin such that the support member is fixed to the sheet.

2. The method of claim 1, wherein the support member is secured to the sheet via the resin, and wherein the step of securing the support member to the sheet comprises:
   placing the support member on a top side of the sheet prior to infusing the sheet with the thermosetting resin and evacuating the vacuum chamber.

3. The method of claim 1, further comprising the step of boring a plurality of aligned holes through adjacent faces extending between the primary ridges and primary grooves once the sheet rigidly retains the shape of the molding surface, wherein the support member is an elongated rod, and wherein the step of placing the support member on at least one of a top side and a bottom side of the sheet comprises inserting the rod through the plurality of bores.

4. The method of claim 1, wherein each corrugation within the second plurality of corrugations comprises a series of linearly alternating secondary ridges and secondary grooves.

5. The method of claim 1, wherein each corrugation within the second plurality of corrugations comprises a secondary ridge or a secondary groove.

6. The method of claim 1, wherein the second plurality of corrugations is defined by a series of alternating secondary ridges and secondary grooves.

7. The method of claim 1, wherein the sheet comprises carbon fiber.

8. The method of claim 1, wherein the second direction is perpendicular to the first direction.

9. A method of manufacturing a cross-corrugated support structure, said method comprising the steps of:
   providing a mold having a molding surface,
   the molding surface being a continuous surface having a first plurality of mold corrugations and a second plurality of mold corrugations,
      the first plurality of mold corrugations being defined by a series of alternating primary ridges and primary grooves extending a length of the molding surface in a first direction,
         wherein each primary ridge and primary groove has a mold face extending therebetween,
      the second plurality of mold corrugations being defined by a series of secondary ridges and secondary grooves extending a length of the molding surface in a second direction perpendicular and intersecting with the first direction such that each mold corrugation within the second plurality of mold corrugations intersects the mold face extending between each primary ridge and primary groove, wherein each secondary ridge and secondary groove is disposed on a surface of the mold face extending between each primary ridge and primary groove;

placing a flexible carbonaceous sheet onto the molding surface;

encapsulating the sheet with a first bag to form a first vacuum chamber,
   wherein the sheet is disposed between the molding surface and the first bag when encapsulated by the first bag;

infusing the sheet with a first application of thermosetting resin;

evacuating the first vacuum chamber of air contained therein, thereby drawing the sheet upon the molding surface such that the sheet forms a shape having a first plurality of sheet corrugations, a second plurality of sheet corrugations, and sheet faces,
   wherein the first plurality of sheet corrugations, the second plurality of sheet corrugations, and the sheet faces of the sheet match the first plurality of mold corrugations, the second plurality of mold corrugations, and the mold faces of the molding surface;

curing the first application of resin such that the sheet rigidly retains the shape formed when evacuating the vacuum chamber;

removing the sheet from the first vacuum chamber;

placing a support member on at least one of a top side and a bottom side of the sheet;

encapsulating the sheet and the support member within a second bag to form a second vacuum chamber;

applying a second application of thermosetting resin to at least one of the support member and the sheet;

evacuating the second vacuum chamber of air contained therein, thereby drawing the support member toward at least one of the top side and the bottom side of the sheet;

curing the second application of thermosetting resin such that the support member is fixed to the sheet.

10. The method of claim 9, wherein the step of placing the flexible carbonaceous sheet onto the molding surface comprises:

placing a first carbon fiber sheet onto the molding surface; and placing a second carbon fiber sheet over the first carbon fiber sheet.

\* \* \* \* \*